US012466051B2

(12) United States Patent
Hesse

(10) Patent No.: US 12,466,051 B2
(45) Date of Patent: Nov. 11, 2025

(54) HAND-HELD POWER TOOL WITH AN INSERT TOOL MAGAZINE

(71) Applicant: Robert Bosch GmbH, Stuttgart (DE)

(72) Inventor: Juergen Hesse, Waldenbuch (DE)

(73) Assignee: Robert Bosch GmbH, Stuttgart (DE)

( * ) Notice: Subject to any disclaimer, the term of this patent is extended or adjusted under 35 U.S.C. 154(b) by 466 days.

(21) Appl. No.: 18/006,501

(22) PCT Filed: Jul. 16, 2021

(86) PCT No.: PCT/EP2021/069951
§ 371 (c)(1),
(2) Date: Jan. 23, 2023

(87) PCT Pub. No.: WO2022/023074
PCT Pub. Date: Feb. 3, 2022

(65) Prior Publication Data
US 2023/0286120 A1 Sep. 14, 2023

(30) Foreign Application Priority Data
Jul. 28, 2020 (DE) ...................... 10 2020 209 489.6

(51) Int. Cl.
*B25F 5/02* (2006.01)
*B23Q 3/157* (2006.01)
(Continued)

(52) U.S. Cl.
CPC .......... *B25F 5/029* (2013.01); *B23Q 3/15713* (2013.01); *B25B 21/00* (2013.01);
(Continued)

(58) Field of Classification Search
CPC .... B25F 1/04; B25F 5/029; B23Q 2003/1553; Y10T 483/1798; Y10T 483/1793; Y10T 483/1827
(Continued)

(56) References Cited

U.S. PATENT DOCUMENTS

| 7,500,981 B1 | 3/2009 | Jubrail |
| 2009/0298658 A1 | 12/2009 | Yeh |
| 2010/0279839 A1* | 11/2010 | Moser ..................... B25B 21/00 483/30 |

FOREIGN PATENT DOCUMENTS

| DE | 10 2011 086 290 A1 | 5/2012 |
| DE | 10 2011 082 785 A1 | 3/2013 |
(Continued)

OTHER PUBLICATIONS

Machine Translation of DE 10 2016 218572 A1 (Year: 2016).*
(Continued)

*Primary Examiner* — Christopher J. Besler
(74) *Attorney, Agent, or Firm* — Maginot, Moore & Beck LLP

(57) ABSTRACT

A hand-held power tool, in particular a power screwdriver, includes a housing in which at least one drive motor is arranged for driving a tool receiving area. The drive motor can be activated via a manual switch, and the tool receiving area is designed to receive an insert tool. The hand-held power tool also includes an insert tool magazine for storing a plurality of selectable insert tools. The manual switch can be actuated in order to load a selected insert tool arranged in the insert tool magazine in the axial direction of the drive motor from the insert tool magazine into the tool receiving area and in order to activate the drive motor.

15 Claims, 11 Drawing Sheets

(51) Int. Cl.
  *B25B 21/00*   (2006.01)
  *B25F 1/04*    (2006.01)
  *B25B 23/12*   (2006.01)

(52) U.S. Cl.
  CPC .......... *B23Q 3/15726* (2013.01); *B25B 23/12*
              (2013.01); *B25F 1/04* (2013.01)

(58) Field of Classification Search
  USPC .............................................. 483/57, 51, 61
  See application file for complete search history.

(56) References Cited

FOREIGN PATENT DOCUMENTS

| | | |
|---|---|---|
| DE | 10 2011 082 787 A1 | 3/2013 |
| DE | 10 2016 218 572 A1 | 3/2018 |
| EP | 2 803 451 A1 | 11/2014 |
| EP | 3 141 351 A1 | 3/2017 |

OTHER PUBLICATIONS

International Search Report corresponding to PCT Application No. PCT/EP2021/069951, mailed Oct. 27, 2021 (German and English language document) (5 pages).

\* cited by examiner

HAND-HELD POWER TOOL WITH AN INSERT TOOL MAGAZINE

This application is a 35 U.S.C. § 371 National Stage Application of PCT/EP2021/069951, filed on Jul. 16, 2021, which claims the benefit of priority to Serial No. DE 10 2020 209 489.6, filed on Jul. 28, 2020 in Germany, the disclosures of which are incorporated herein by reference in their entirety.

BACKGROUND

The present disclosure relates to a hand-held power tool, in particular a power screwdriver, comprising a housing in which at least one drive motor is arranged for driving a tool receiving area, wherein the drive motor can be activated via a manual switch, and wherein the tool receiving area is designed to receive an insert tool, and comprising an insert tool magazine for storing a plurality of selectable insert tools.

Such a hand-held power tool comprising an insert tool magazine is known from the prior art. A sliding device is provided for moving or displacing an insert tool arranged in the insert tool magazine into the tool receiving area of the hand-held power tool. By a user of the hand-held power tool manually moving or displacing a sliding element associated with the sliding device in the longitudinal direction, an insert tool is moved from the insert tool magazine into the tool receiving area.

SUMMARY

The disclosure relates to a hand-held power tool, in particular a power screwdriver, comprising a housing in which at least one drive motor is arranged for driving a tool receiving area, wherein the drive motor can be activated via a manual switch, and wherein the tool receiving area is designed to receive an insert tool, and comprising an insert tool magazine for storing a plurality of selectable insert tools. The manual switch can be actuated in order to load a selected insert tool arranged in the insert tool magazine in the axial direction of the drive motor from the insert tool magazine into the tool receiving area and in order to activate the drive motor.

The disclosure thus makes it possible to provide a hand-held power tool in which both an activation of the drive motor and a displacement of an insert tool from the insert tool magazine into the tool receiving area can be brought about by the manual switch so that a simple and user-friendly operation can be made possible overall.

Preferably, the manual switch can be actuated from an unloaded rest position into a loading position, in which the selected insert tool arranged in the insert tool magazine is loaded into the tool receiving area, and into a working position, in which the drive motor is activated.

Thus, a multifunctional manual switch can be provided in a simple manner.

Preferably, a loading device with a loading element is associated with the manual switch and loads the selected insert tool arranged in the insert tool magazine into the tool receiving area in the loading position of the manual switch.

A secure and reliable displacement of the insert tool into the tool receiving area can thus be made possible.

The loading device preferably has a lever arm which connects the manual switch to the loading element.

A movement of the manual switch can thus be transmitted to the loading device in a simple and uncomplicated manner.

In accordance with one embodiment, the lever arm is connected via a slider to the loading element, wherein the slider has receptacles and the lever arm has cams which are arranged in the receptacles.

A coupling between the lever arm and the loading device can thus be made possible in a simple manner.

Preferably, at least one toothed wheel is arranged on the slider and the loading element has an associated toothed rack portion for moving the loading element in the axial direction of the drive motor in order to load the selected insert tool arranged in the insert tool magazine into the tool receiving area.

A secure and reliable displacement of the selected insert tool arranged in the insert tool magazine into the tool receiving area can thus be made possible.

The loading device preferably has a locking element which locks the loading element in a locking position in the loading position of the manual switch.

Unintentional movement of the loading element can thus be prevented in a simple manner.

The locking element can preferably be manually actuated in the locking position in order to release the loading element.

A secure and reliable release of the loading element can thus be made possible.

In accordance with one embodiment, the manual switch arranged in the working position can be released from the working position into the loading position in order to deactivate the drive motor, wherein an adjustment of the manual switch from the loading position into the rest position takes place only if the locking element is arranged in an associated release position.

Unintentional release of the insert tool arranged in the tool receiving area can thus be prevented in a simple and uncomplicated manner.

For the selection of an insert tool from the plurality of insert tools, the insert tool magazine is preferably mounted via a magazine shaft in or on the housing in a rotationally movable manner, wherein a rotation of the insert tool magazine for the selection of an insert tool from the plurality of insert tools takes place by a user of the hand-held power tool manually rotating the insert tool magazine about the magazine shaft of the insert tool magazine.

A secure and reliable operation of the insert tool magazine can thus be made possible.

In accordance with one embodiment, an actuating element for actuating the insert tool magazine is provided, wherein a movement of the actuating element by a user of the hand-held power tool in the transverse direction of the magazine shaft of the insert tool magazine causes the insert tool magazine to rotate about the magazine shaft.

The insert tool magazine can thus be rotated in a simple manner to select a desired insert tool.

Preferably, the actuating element is associated with at least two spring elements, which can be compressed when the actuating element is displaced in the transverse direction of the magazine shaft in order to rotate the insert tool magazine, wherein a support element fixed to the housing is arranged between the at least two spring elements.

An intuitive actuation of the actuating element can thus be made possible.

The manual switch is preferably arranged on a handle of the hand-held power tool, the locking element is preferably arranged on a region of the housing of the hand-held power tool facing away from the tool receiving area, and the insert tool magazine, in particular the actuating element, is preferably arranged on a region of the housing of the hand-held power tool facing the tool receiving area and the manual switch in such a way that one-handed operation is made possible.

A compact and easy-to-use hand-held power tool can thus be provided.

BRIEF DESCRIPTION OF THE DRAWINGS

The invention disclosure is explained in more detail in the following description with reference to exemplary embodiments shown in the drawings. In the drawings.

DETAILED DESCRIPTION

Figure 1:
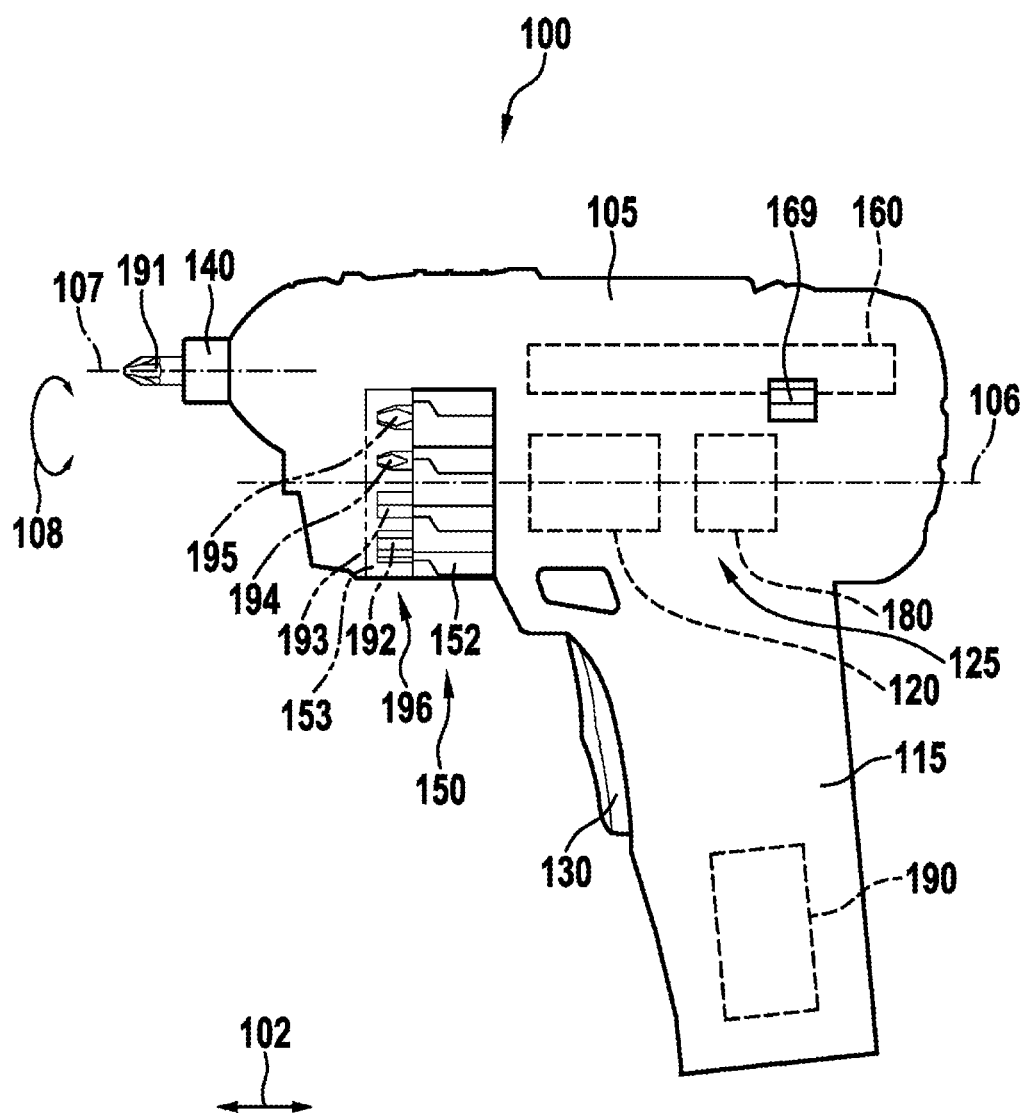
FIG. 1 is a schematic view of a hand-held power tool with an insert tool magazine and a loading device.

In the drawings, elements with the same or comparable function are provided with identical reference signs and described in more detail only once.

FIG. 1 shows, by way of example, a hand-held power tool 100 designed as a power screwdriver, with a housing 105, in which at least one drive unit 125 is arranged. The housing 105 is preferably formed from two half-shells (202 in FIG. 2).

The drive unit 125 preferably has at least one drive motor 180 for driving a tool receiving area 140 of the hand-held power tool 100. The drive motor 180 can be activated via a manual switch 130. The manual switch 130 is arranged on a handle 115 of the housing 105.

In accordance with one embodiment, a gear train 120 is associated with the drive unit 125. The gear train 120 is preferably designed as a planetary gear train.

The tool receiving area 140 is designed to receive a selected insert tool 191 from a plurality of insert tools 196. By activating the drive motor 180, the insert tool 191 arranged in the tool receiving area 140 can be illustratively rotated with the tool receiving area 140.

The hand-held power tool 100 preferably has an insert tool magazine 150 for storing a plurality of selectable insert tools 196. In the insert tool magazine 150, a plurality of insert tools 196, or insert tools 192, 193, 194, 195, are illustratively arranged. The insert tool 191 arranged in the tool receiving area 140 is likewise associated with the plurality of insert tools 196. In FIG. 1, the insert tool 191 is loaded or displaced from the insert tool magazine 150 into the tool receiving area 140 and can be pushed back into the insert tool magazine 150 after use. In order to select an insert tool of the insert tools 191-195 arranged in the insert tool magazine 150, the insert tool magazine 150 can be rotated in the circumferential direction 108.

Preferably, a drive axis 106 is associated with the drive unit 125. Furthermore, an output axis 107 is associated with the tool receiving area 140. The drive axis 106 is designed to drive the output axis 107. The drive axis 106 and the output axis 107 are preferably arranged parallel to one another. The insert tool magazine 150 is preferably arranged on the drive axis 106.

The insert tool magazine 150 has a ring-like or drum-like housing 152, 153 which can be rotated in its longitudinal axis and is preferably two-part in the longitudinal direction. A first housing part 152 preferably consists of a non-transparent plastics material, while a second housing part 153, which adjoins the first housing part 152 in the longitudinal direction, is preferably formed from transparent plastics material. The first housing part 152 can serve for manually adjusting the insert tool magazine 150 in the hand-held power tool 100 and can be equipped, for example, with grooves or the like in order to enable a simple and precise adjustment of the insert tool magazine 150 for a user.

Within the housing, receptacles (1110 in FIG. 12) arranged at regular angular distances from one another are designed to receive a respective insert tool 191, 192, 193, 194, 195. The receptacles are designed in such a way that the insert tools 191, 192, 193, 194, 195 can each be inserted or guided into the respective receptacle by means of a pin-shaped element, for which purpose the receptacles have, for example, corresponding openings or apertures on their two mutually opposite end faces. In particular, the insert tools 192, 193, 194, 195 are designed as so-called BIT tools which have different tool tips in order to be able to screw different fastening elements, in particular different screws, in or out.

The second, transparent housing part 153 is arranged in the region of the insert tools 192, 193, 194, 195, in which region the tips of the insert tools 192, 193, 194, 195 are also located. This makes it possible for a user to recognize, from outside the hand-held power tool 100, which insert tool 192, 193, 194, 195 is located in a respective receptacle, since the tip of each insert tool is a characteristic feature of the insert tool 192, 193, 194, 195.

The manual switch 130 can preferably be actuated in order to load or displace a selected insert tool 191 arranged in the insert tool magazine 150 in the axial direction, or the longitudinal direction 102 of the drive unit 125, or of the drive motor 180, from the insert tool magazine 150 into the tool receiving area 140. The manual switch 130 can likewise preferably be actuated to activate the drive motor 180.

Figure 10:
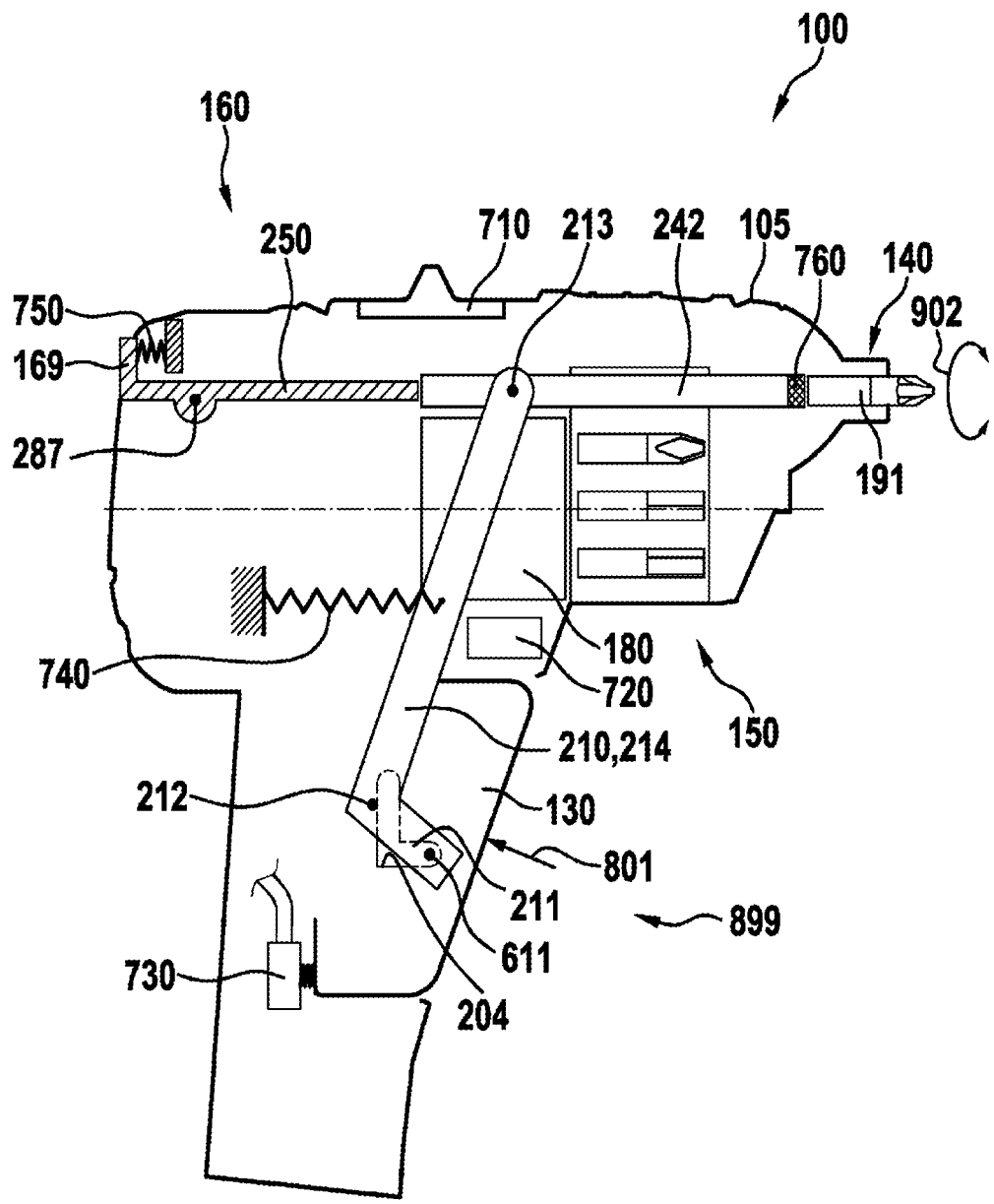
FIG. 10 is a side view of the hand-held power tool of FIG. 8 and FIG. 9 with a further position of the loading device.

Preferably, the manual switch 130 can be loaded or actuated from an unloaded rest position (281 in FIG. 2) into a loading position (381 in FIG. 3) and/or into a working position (899 in FIG. 10). In the unloaded rest position (281 in FIG. 2), a user of the hand-held power tool 100 does not actuate the manual switch 130. Furthermore, a user of the hand-held power tool 100 in the loading position (381 in FIG. 3) loads the manual switch 130 by a first travel path starting from the rest position. In this case, the selected insert tool 191 arranged in the insert tool magazine 150 is loaded or pushed into the tool receiving area 140 in the loading position (381 in FIG. 3). In addition, in the working position (899 in FIG. 10), the manual switch 130 is loaded by a further loading path starting from the loading position. The drive motor 180 is preferably activated in the working position (899 in FIG. 10) of the manual switch 130.

A loading device 160 is preferably associated with the manual switch 130. In the loading position (381 in FIG. 3) of the manual switch 130, the loading device 160 loads the selected insert tool 191 arranged in the insert tool magazine 150 into the tool receiving area 140. The loading device 160 is associated with an unlocking element 169 for unlocking.

In accordance with one embodiment, the hand-held power tool 100 can be mechanically and electrically connected to a battery pack 190 for a grid-independent power supply but can alternatively or additionally also be operable in a grid-dependent manner.

Figure 2:
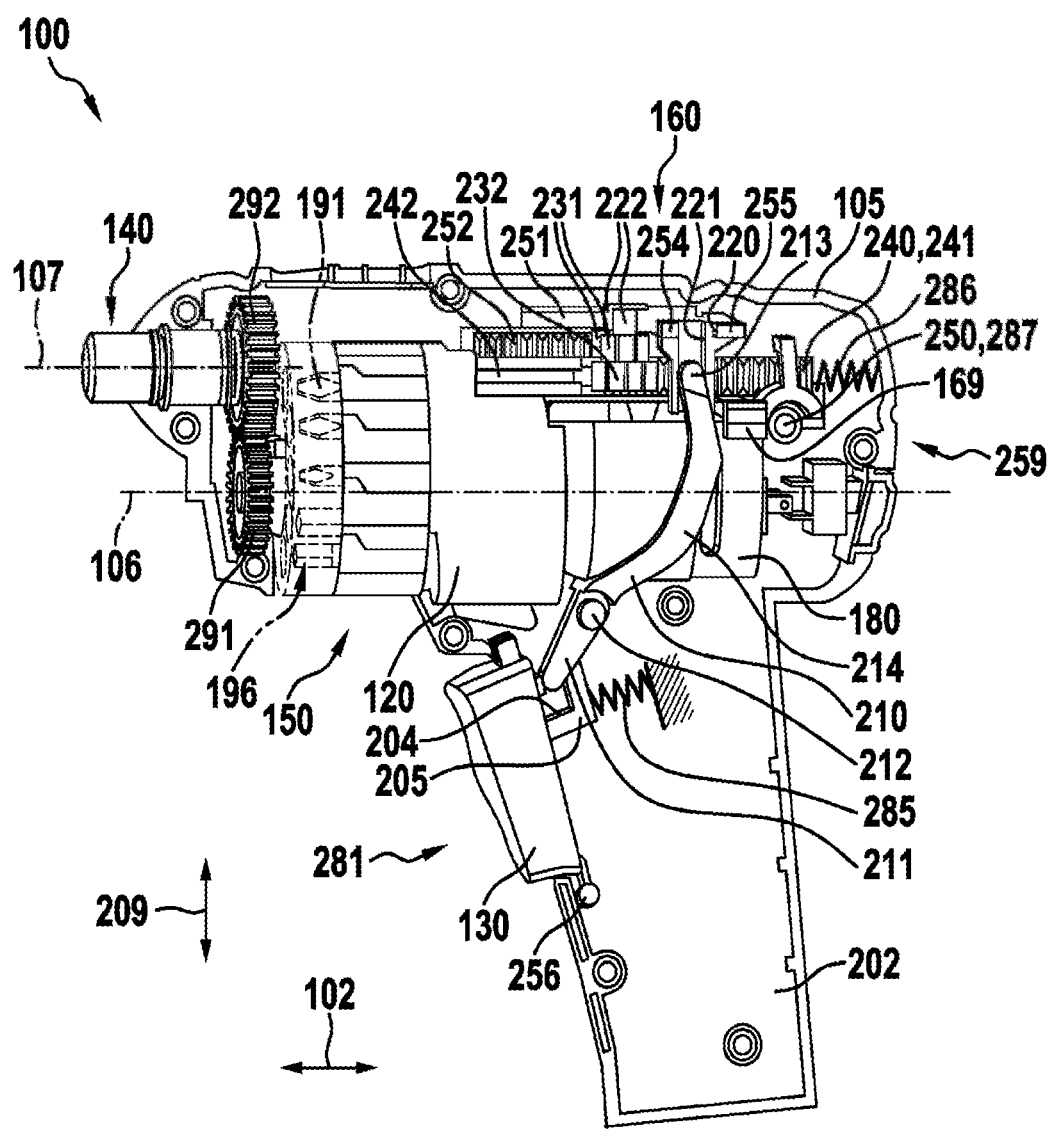
FIG. 2 is a perspective view of the hand-held power tool of FIG. 1 with an opened housing in a first position of the loading device.

FIG. 2 shows the hand-held power tool 100 of FIG. 1, wherein the housing 105 is illustratively opened or only one half-shell 202 of the housing 105 is shown. FIG. 2 illustrates the structure of the drive unit 125 with the drive motor 180 as well as the insert tool magazine 150 and the loading device 160.

The loading device 160 is preferably associated with a loading element 242, which loads or displaces the selected insert tool 191 arranged in the insert tool magazine 150 into the tool receiving area 140 in the loading position (381 in FIG. 3) of the manual switch 130. In FIG. 2, the insert tool 191 is arranged in the insert tool magazine 150. Furthermore, the loading device 160 preferably has a lever arm 210, which connects the manual switch 130 to the loading element 242. Preferably, the lever arm 210 is connected to the loading element 242 via a slider 220. In this case, the slider 220 has receptacles 221 and the lever arm 210 has cams 213 which are arranged in the receptacles 221. At least one toothed wheel 231, 232 is arranged on the slider 220.

The loading element 242 preferably has an elongate base body 240. Furthermore, the loading element 242 preferably has a toothed rack portion 241, arranged facing away from the tool receiving area 140, for moving or displacing the loading element 242 in the axial direction, or the longitudinal direction 102 of the drive motor 180. The toothed rack portion 241 has toothings laterally or facing the housing half-shells 202. In this case, when the loading element 242 is moved in the axial direction 102, the selected insert tool 191 arranged in the insert tool magazine 150 is loaded or displaced into the tool receiving area 140.

In addition, the loading device 160 preferably has a locking element 250. In the loading position (381 in FIG. 3) of the manual switch 130, the locking element 250 preferably locks the loading element 242 in a locking position (359 in FIG. 3). Furthermore, the locking element 250 can be manually actuated in a locking position (359 in FIG. 3) in order to release the loading element 242.

In FIG. 2, the manual switch 130 is arranged in its rest position 281. Preferably, a spring element 285 loads the manual switch 130 into this rest position 281. However, in its rest position, the manual switch 130 is not loaded or actuated by a user. The spring element 285 is arranged fixed to the housing.

The manual switch 130 preferably has at least one cam element 256, by means of which the manual switch 130 is rotatably mounted in at least one of the two housing half-shells 202. In addition, the manual switch 130 has a guide element 205, which forms a receptacle 204. Preferably, the receptacle 204 is L-shaped.

The lever arm 210 is preferably rotatably mounted in at least one housing half-shell 202 via at least one bearing element 212. The bearing element 212 is preferably arranged on a receiving portion 211. The receiving portion 211 is preferably arranged in the receptacle 204 of the manual switch 130. At its end facing away from the manual switch 130, the lever arm 210 has a lever portion 214. At its end facing the slider 220, the lever portion 214 has the cams 213. In accordance with one embodiment, the lever portion 214 is fork-shaped, or U-shaped, wherein the drive motor 180 is encompassed by the lever portion 214. At its end facing away from the manual switch 130, the U-shaped lever portion 214 preferably has a cam 213.

On its sides facing the respective housing half-shells 202, or in the vertical direction 209 of the hand-held power tool 100, the slider 220 preferably has in each case a receptacle 221 for guiding the cam 213 of the lever arm 210. Furthermore, the slider 220 has at least one guide element 254, 255 for guiding in the axial direction or longitudinal direction 102 in a guide groove 251 facing the housing half-shells 202. In addition, the slider 220 has at least one, preferably two bearing pins 222 formed in the vertical direction 209. The preferably two bearing pins 222 are designed to mount the at least one toothed wheel 231, 232. Two toothed wheels 231, 232 are preferably arranged on each bearing pin 222. In this case, a toothed wheel 231, illustratively the upper toothed wheel in FIG. 2, is operatively connected to a toothing 252 of the housing half-shell 202. The toothed wheel 232, illustratively the lower toothed wheel in FIG. 2, is preferably operatively connected to the toothed rack portion 241 of the loading element 242.

In addition, in FIG. 2, the locking element 250 is arranged in its release position 259. In its release position 259, the locking element 250 is preferably arranged parallel to the loading element 242. The locking element 250 preferably has an elongate base body, which is arranged in the longitudinal direction 102 in FIG. 2, and at least one, illustratively two unlocking elements 169. The unlocking elements 169 are preferably arranged in the transverse direction (499 in FIG. 4) to the longitudinal axis 102 on the locking element 250.

In accordance with one embodiment, the unlocking elements 169 are formed integrally with the locking element 250. Preferably, the two unlocking elements 169 each penetrate a recess of the housing half-shells 202. A user can thus actuate the unlocking elements 169 in order to unlock or release the locking element 250. Preferably, a spring element 286 is associated with the locking element 250. The spring element 286 pretensions the locking element 250. Furthermore, the locking element 250 has a pivot point 287, about which it can be rotated to move it from the release position 259 into its locking position (359 in FIG. 3) or vice versa. In this case, the pivot point 287 is fixed to the housing or mounted on the housing 105, in particular the housing half-shells 202.

In addition, FIG. 2 illustrates the parallel arrangement of the drive axis 106 to the output axis 107, wherein the two axes 106, 107 are spaced apart from one another in the vertical direction 209. Preferably, a toothed wheel 291 is associated with the drive axis 106 and a toothed wheel 292 is associated with the output axis 107, wherein the two axes 106, 107 are operatively connected to one another via the two toothed wheels 291, 292.

Figure 7:
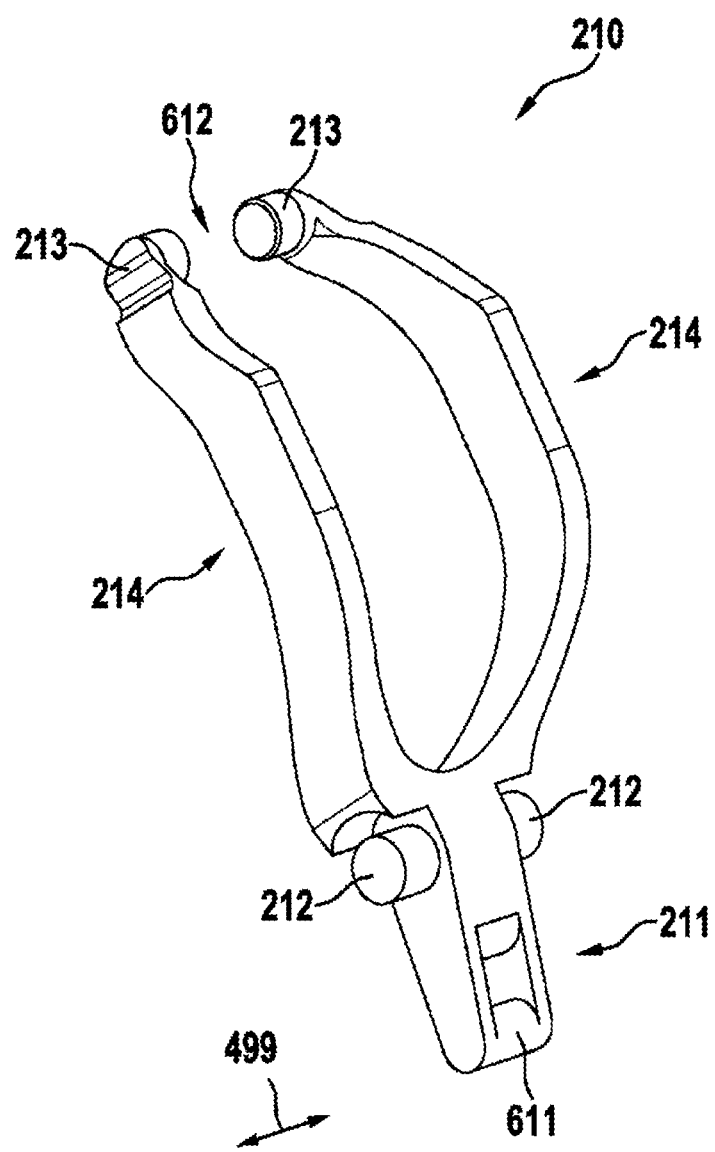
FIG. 7 is a perspective view of a lever arm associated with the loading device of FIG. 1 to FIG. 4.

The lever arm 210 preferably has a receptacle (612 in FIG. 7), wherein the slider 220 with the toothed wheels 231, 232, the locking element 250 and the loading element 242, as well as the drive motor 180, are arranged within the receptacle (612 in FIG. 7). In particular, the lever portion 214 of the lever arm 210 encompasses the slider 220 with the toothed wheels 231, 232, the locking element 250, the loading element 242, and the drive motor 180.

Figure 3:
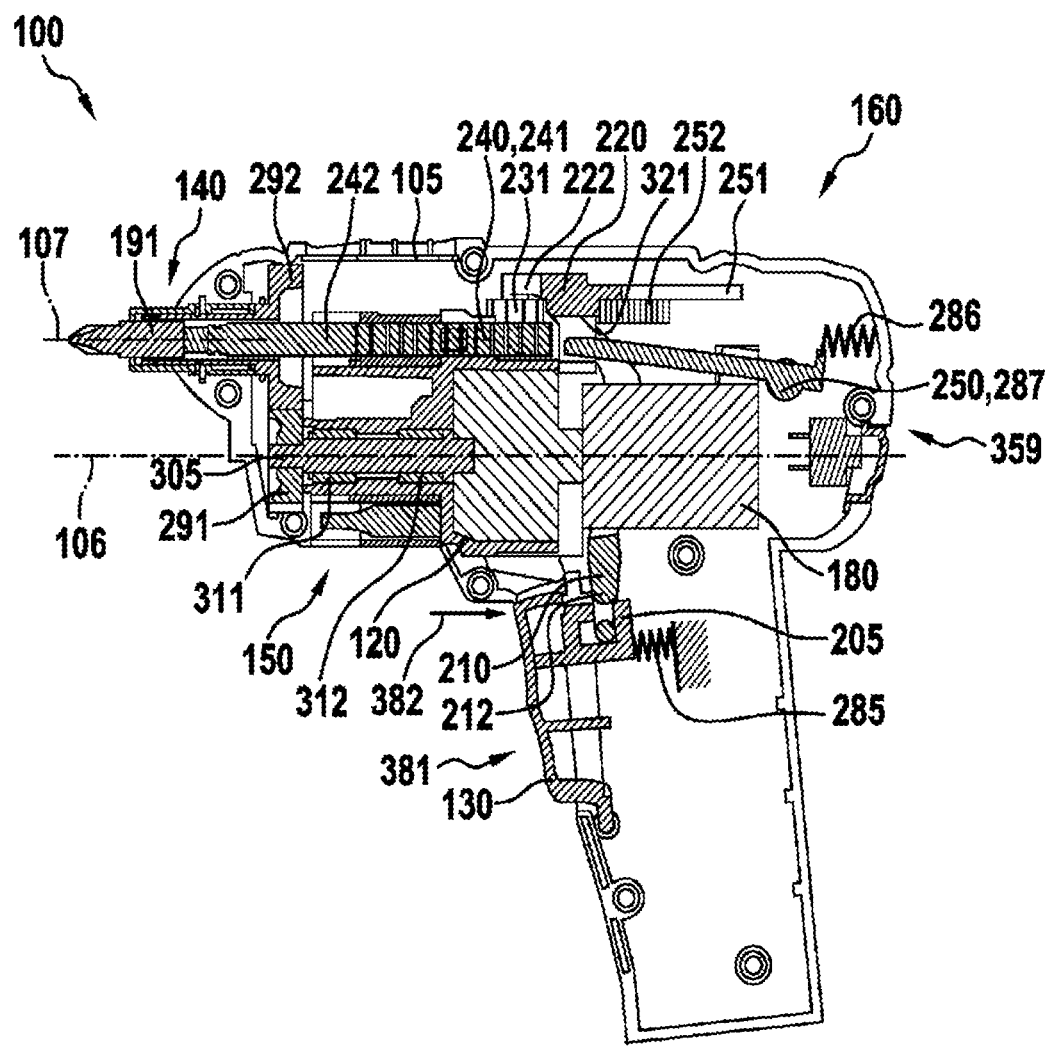
FIG. 3 is a sectional view of the hand-held power tool of FIG. 2 with an opened housing in a further position of the loading device.

FIG. 3 shows the hand-held power tool 100 of FIG. 2 with the loading device 160, wherein the manual switch 130 is moved by a user into a loading position 381 by loading or actuating in the direction of an arrow 382. The arrangement of the manual switch 130 in the loading position 381 partially compresses the spring element 285. In addition, the lever arm 210 is rotated, illustratively counter-clockwise, about its bearing element 212, or with its cams 213 of FIG. 2 toward the tool receiving area 140. As a result, the cams 213 of the lever arm 210 load the slider 220, as a result of which the slider 220 is displaced, illustratively in FIG. 3 to the left, or toward the tool receiving area 140. When the slider 220 is displaced, the toothed wheel 231 moves on the toothing 252 in the housing 105.

The loading element 242 is preferably arranged in a receiving portion 321 of the slider 220. The receiving portion 321 is formed in the transverse direction (499 in FIG. 4), or centrally between the two bearing pins 222 of the slider 220. The toothed wheel 232 preferably moves the loading element 242 over the toothed portion 241 in the longitudinal direction 102 (see FIG. 1 and FIG. 2) to the tool receiving area 140. By moving the loading element 242 to the tool receiving area 140, the insert tool 191 is loaded or displaced from the insert tool magazine 150 into the tool receiving area 140. Due to the displacement of the loading element 242 toward the tool receiving area 140, the receiving portion 321 is released from the loading element 242 so that the locking element 250 pivots into its locking position 359 via its pivot point 287. As a result, the loading element 242 is locked by the locking element 250 in the longitudinal direction 102 (see FIG. 1 and FIG. 2).

A magazine shaft 305 is preferably associated with the insert tool magazine 150. The insert tool magazine 150 is preferably mounted on the magazine shaft 305 via two bearing elements 311, 312. In accordance with one embodiment, the magazine shaft 305 is associated with the drive axis 106. The magazine shaft 305 preferably forms the drive axis 106. In order to select an insert tool 191 from the plurality of insert tools 196 of FIG. 1 and FIG. 2, the insert tool magazine 150 is mounted rotationally movable in or on the housing 105 via the magazine shaft 305. Preferably, the insert tool magazine 150 is rotated to select an insert tool 191 from the plurality of insert tools 196 by a user of the hand-held power tool 100 manually rotating the insert tool magazine 150. In this case, the insert tool magazine 150 is rotated about the magazine shaft 305.

Figure 4:
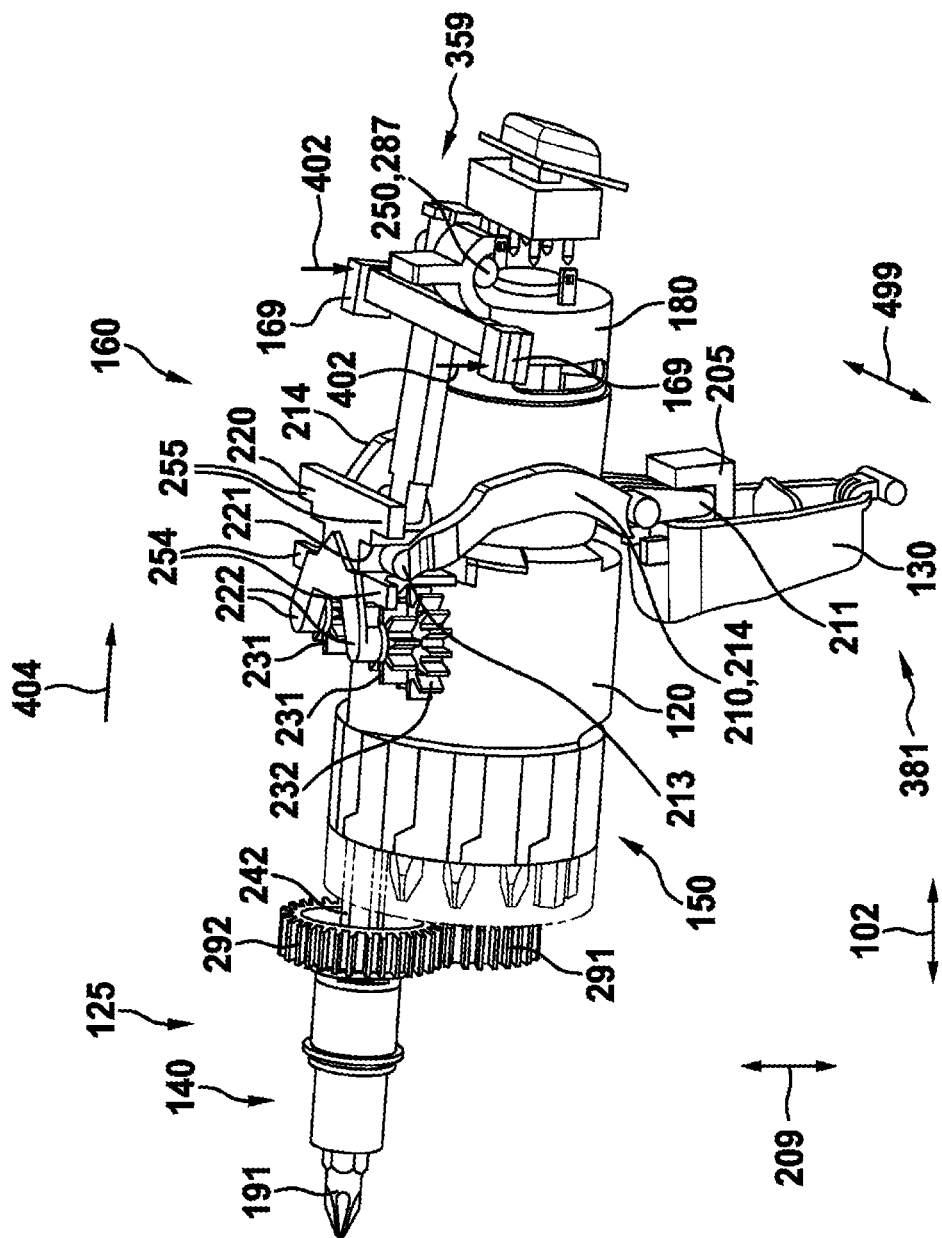
FIG. 4 is a perspective view of the loading device of FIG. 1 to FIG. 3 with a manual switch associated with the hand-held power tool, the insert tool magazine, and a tool receiving area of the hand-held power tool in the position of the loading device of FIG. 3.

FIG. 4 shows the drive unit 125 of the hand-held power tool 100 of FIG. 1 to FIG. 3 with the drive motor 180, the gear train 120, the insert tool magazine 150, the tool receiving area 140, and the manual switch 130 with the loading device 160. Illustratively, FIG. 4 shows the manual switch 130 in the loading position 381.

In particular, FIG. 4 illustrates the slider 220 with its receptacles 221, which are formed in the vertical direction 209 and in which the cams 213 of the lever arm 210 are arranged. In addition, FIG. 4 illustrates the bearing pins 222 of the slider 220, on which bearing pins the toothed wheels 231, 232 are mounted. The bearing pins 222 are preferably spaced apart from one another in the transverse direction 499 so that a bearing pin 222 with associated toothed wheels 231, 232 is arranged on each side of the loading element 242. Conversely, the loading element 242 is arranged between the bearing pins 222 with the associated toothed wheels 231, 232.

Furthermore, FIG. 4 shows the guide webs 254, 255 of the slider 220. Preferably, the slider 220 has two opposite guide webs 254, 255 for guiding in the guide groove 251 of FIG. 2 and FIG. 3 of the housing 105 of FIG. 1. The guide webs 254, 255 are formed in the transverse direction 499. In this case, the guide webs 254 are arranged facing the tool receiving area 140 in the longitudinal direction 102 and the guide webs 255 are arranged facing the locking element 250. Preferably, the receptacles 221 are arranged between the guide webs 254, 255 in the longitudinal direction 102.

Furthermore, the locking element 250 in FIG. 4 is arranged in its locking position 359, in which the loading element 242 is blocked by the locking element 250. In addition, FIG. 4 illustrates the locking element 250 with its two unlocking elements 169 formed in the transverse direction 499. The unlocking elements 169 are preferably arranged perpendicularly on the base body of the locking element 250. By loading at least one unlocking element 169 illustratively downward, or in the direction of an arrow 402, the locking element 250 is tilted over its pivot point 287, whereupon the locking element 250 releases the loading element 242. Due to the release of the loading element 242, the slider 220 moves back illustratively to the right, or along an arrow 404, as a result of which the lever arm 210 releases the manual switch 130 and the manual switch 130 is moved by the spring element 285 of FIG. 2 and FIG. 3 into the rest position 281 of FIG. 2.

Figure 5:
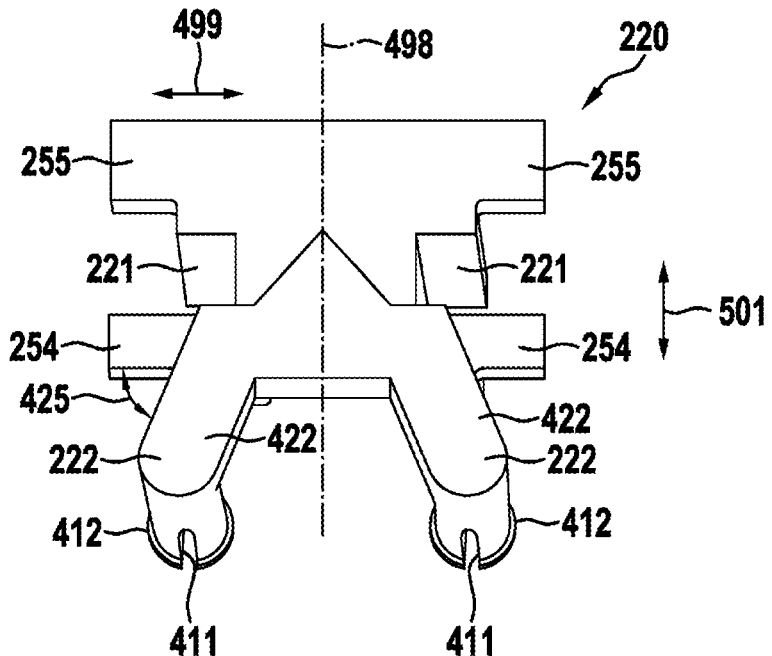
FIG. 5 is a plan view of a slider associated with the loading device of FIG. 1 to FIG. 4.

FIG. 5 shows the slider 220 of the loading device 160 of FIG. 1 to FIG. 4. The slider 220 has two guide webs 254, 255 which are arranged spaced apart from one another in the longitudinal extension 501 of the slider 220. In the assembled state of the loading device 160, the longitudinal direction 501 of the slider 220 is preferably parallel to the longitudinal direction 102 of the drive unit 125 of FIG. 1 to FIG. 4. The receptacles 221 for guiding the lever arm 210 of FIG. 2 to FIG. 4 are respectively arranged between the two guide webs 254, 255. The guide webs 254, 255 are formed perpendicularly to the longitudinal extension 501.

In addition, a connecting web 422 is preferably arranged on the guide web 254, the bearing pin 222 preferably being formed on the free end of said connecting web. In this case, the bearing pin 222 is at least approximately cylindrical. The bearing pin 222 is formed perpendicularly to the plane of the sheet and, at its free end, preferably has a retaining web 412. The retaining web 412 has a larger diameter than the bearing pin 222.

Furthermore, the bearing pin 222 preferably has at least one slot 411 at its free end. By means of the at least one slot 411, the bearing pin 222 is formed resiliently on its free end. Due to the resilient design of the bearing pin 222, the toothed wheels 231, 232 of FIG. 2 and FIG. 4 can be pushed onto the bearing pin 222. Preferably, the connecting web 422 is arranged at an angle 425 to the guide web 254, or to the transverse direction 499. In addition, an axis of symmetry 498 is illustratively associated with the slider 222 in FIG. 5.

Figure 6:
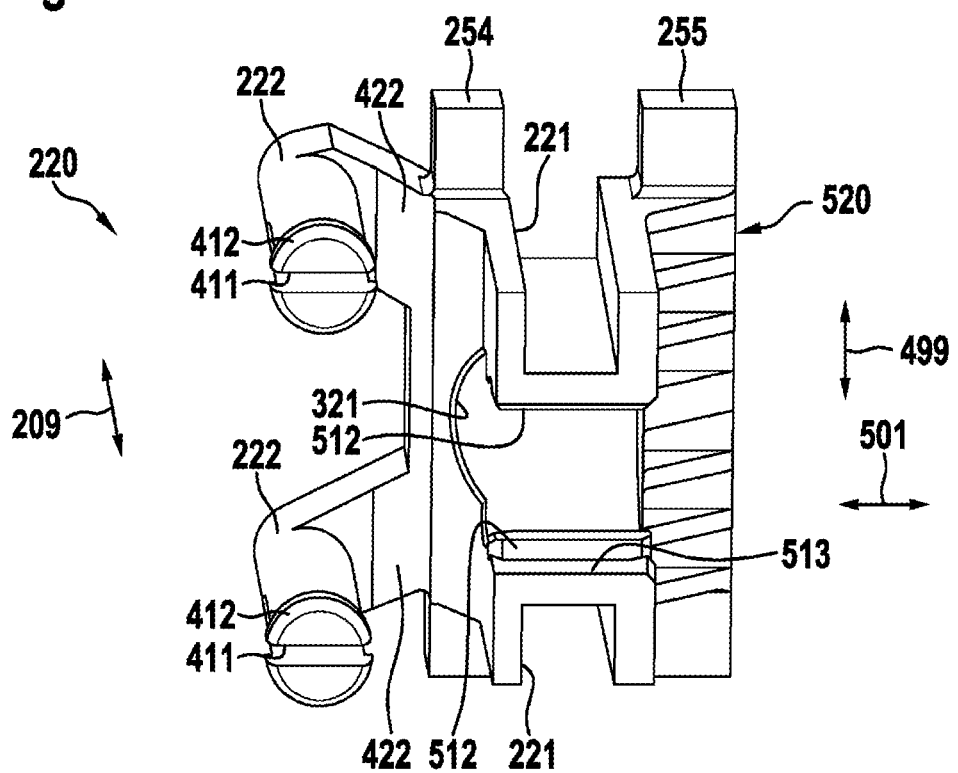
FIG. 6 is a plan view of the slider of FIG. 5, viewed from an underside.

FIG. 6 shows the slider 220 of FIG. 5, viewed from an underside. FIG. 6 illustrates the bearing pins 222 with their retaining web 412 and the at least one slot 411. Furthermore, FIG. 6 shows the receptacles 221, which are formed in the vertical direction 209. The receptacles 221 form the central receiving region 321 for receiving the loading element 242 of FIG. 2 to FIG. 4. The receiving region 321 is formed in the longitudinal direction 501 of the slider 220.

For secure arrangement of the loading element 242 in the receiving region 321, at least one latching web 512 formed in the transverse direction 499, or in the radial direction of the receiving region 321, is preferably provided. Two latching webs 512 are preferably provided, wherein the latching webs 512 are arranged on a side which is associated with the receptacles 221 and faces the receiving region 321. In addition, on their side facing the receiving region 321, in the region of their free end, the receptacles 221 have a receiving portion 513. Preferably, the locking element 250 of FIG. 2 to FIG. 4 is arranged in its release position 259 in the receiving portion 513 and in its locking position 359 in the receiving region 321. Furthermore, the slider 220 preferably has reinforcement ribs 520 on the guide webs 255.

FIG. 7 shows the lever arm 210 of the loading device 160 of FIG. 2 to FIG. 4. FIG. 7 illustrates the receiving portion 211 with the preferably two oppositely arranged bearing elements 212. The bearing elements 212 are arranged outward in the transverse direction 499, or perpendicularly, on the receiving portion 211, in particular on a region of the receiving portion 211 facing the lever portion 214. As described above, the bearing elements 211 mount the lever arm 210 in the housing 105 of the hand-held power tool 100 of FIG. 1 to FIG. 3 and preferably form an axis of rotation. In addition, a loading pin 611 is arranged on an end of the receiving portion 211 facing away from the lever portion 214. The loading pin 611 is loaded by the manual switch 130 of FIG. 1 to FIG. 4, as a result of which the lever arm 210 is pivoted about its axis of rotation or the bearing elements 212.

Furthermore, FIG. 7 illustrates the lever portions 214 with their cams 213, which are directed in the transverse direction 499, or inward, for arrangement in the receptacles 221 of the slider 220 of FIG. 5 and FIG. 6. As described above, the lever portions 214 form at least approximately a U shape with a receptacle 612. The drive motor 180 of FIG. 1 to FIG. 4 is arranged in the receptacle 612, i.e., the lever portions 214 encompass the drive motor 180.

Figure 8:
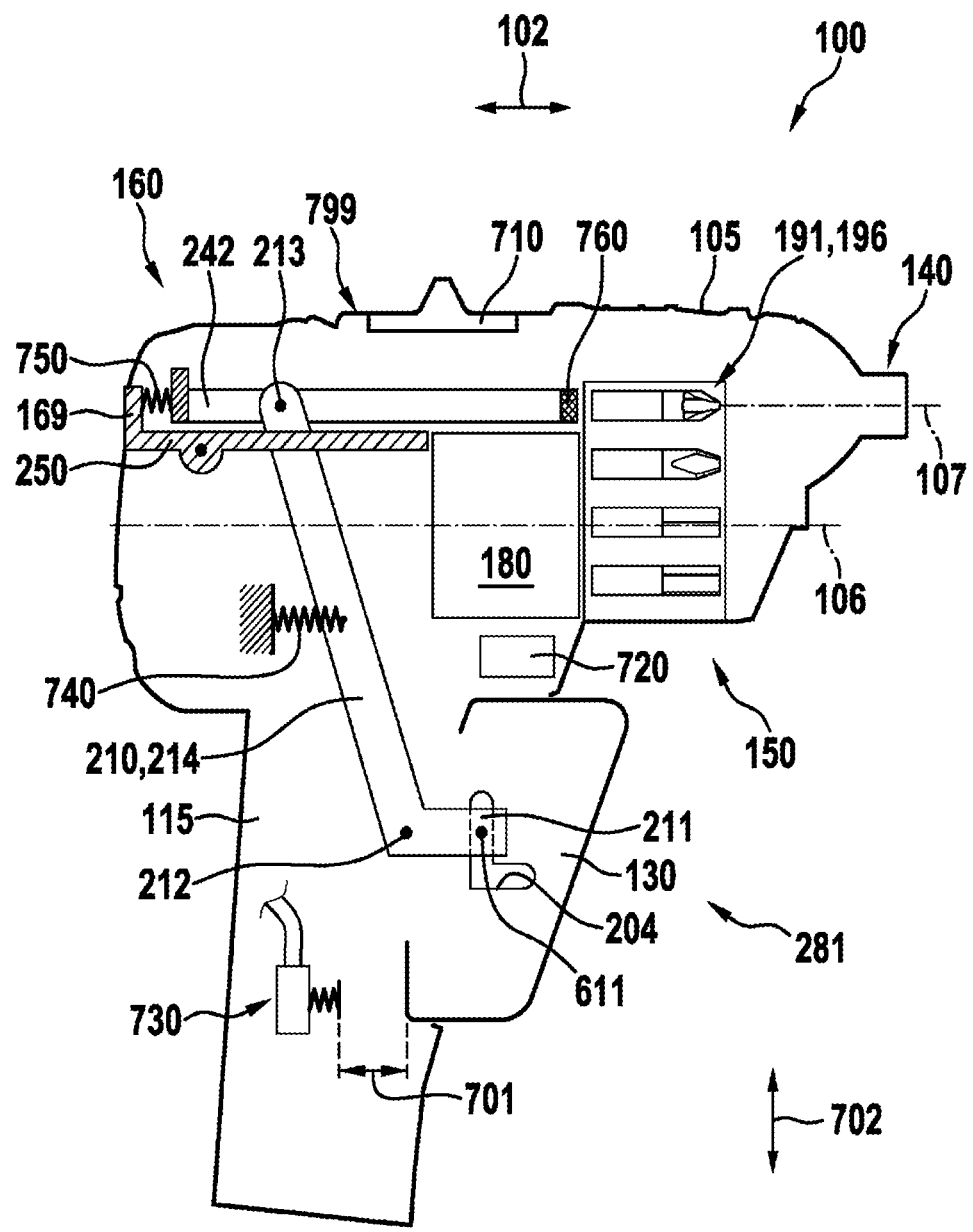
FIG. 8 is a side view of the hand-held power tool of FIG. 1 with an alternative loading device in a first position.

FIG. 8 shows the hand-held power tool 100 of FIG. 1 to FIG. 3 with the manual switch 130 in the rest position 281. An on/off switch 730, which is designed to activate the drive motor 180, is associated with the manual switch 130. In the rest position 281, a distance 701 is formed between the manual switch 130 and the on/off switch 730.

In accordance with the embodiment shown in FIG. 8, the lever arm 210 is loaded into a rest position by a spring 740 fixed to the housing. In the embodiment shown in FIG. 8, the lever arm 210 is L-shaped and is preferably connected directly to the loading element 242 via at least one cam 213. The lever arm 210 can have a lever portion 214, which is arranged laterally on the drive motor 180, or, as shown in FIG. 2 to FIG. 4, can have two lever portions 214.

In addition, the locking element 250 is illustratively pretensioned against the loading element 242 by a spring element 750. In this case, the locking element 250 has only one unlocking element 169. Preferably, the unlocking element 169 in the embodiment of FIG. 8 is arranged on a rear side of the hand-held power tool 100, or on an end of the hand-held power tool 100 opposite the tool receiving area 140. By actuating the unlocking element 169 in the longitudinal direction 102, or toward the tool receiving area 140, a release can take place. At its end facing the tool receiving area 140, or its end facing the plurality of insert tools 196, the loading element 242 is preferably associated with a magnetic element 760. The magnetic element 760 is designed to securely load an insert tool 191 from the insert tool magazine 150 into the tool receiving area 140 or from the tool receiving area 140 into the insert tool magazine 150.

A rotational direction switch 710 of the drive motor 180 is preferably arranged on an upper side 799 of the hand-held power tool 100. In order to adjust the rotational direction, the rotational direction switch 710 can be moved in the longitudinal direction 102. An actuating element 720 is preferably provided for actuating the insert tool magazine 150. The actuating element 720 is preferably arranged between the drive motor 180 and the manual switch 130 in the vertical direction 702 and can preferably be actuated in the transverse direction 499 of FIG. 4.

Figure 12:
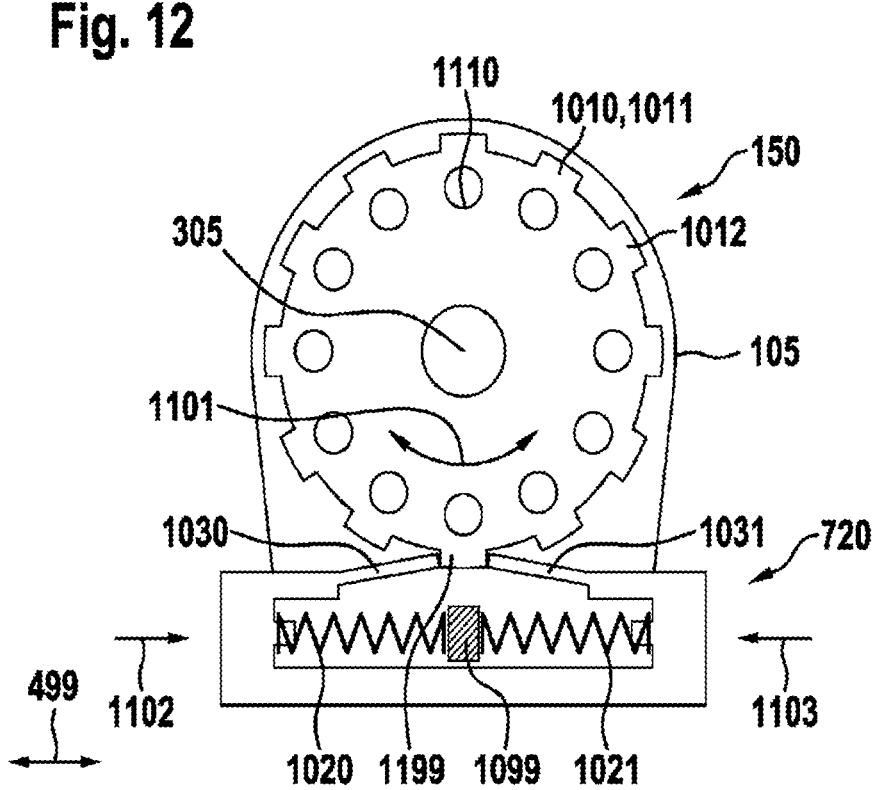
FIG. 12 is a front view of the insert tool magazine of FIG. 11.

In accordance with one embodiment, a displacement of the actuating element 720 by a user of the hand-held power tool 100 in the transverse direction 499 of FIG. 4, or 1102, 1103 of FIG. 12, of the magazine shaft 305 of FIG. 3 of the insert tool magazine 150, causes the insert tool magazine 150 to rotate about the magazine shaft 305. The manual switch 130 is preferably arranged on the handle 115 of the hand-held power tool 100. The locking element 250 is preferably arranged on a region of the housing 105 of the hand-held power tool 100 facing away from the tool receiving area 140. In addition, the insert tool magazine 150, in particular the actuating element 720, is arranged on a region of the housing 105 of the hand-held power tool 100 facing the tool receiving area 140 and the manual switch 130, in such a way that a one-handed operation of the insert tool magazine is made possible.

Figure 9:
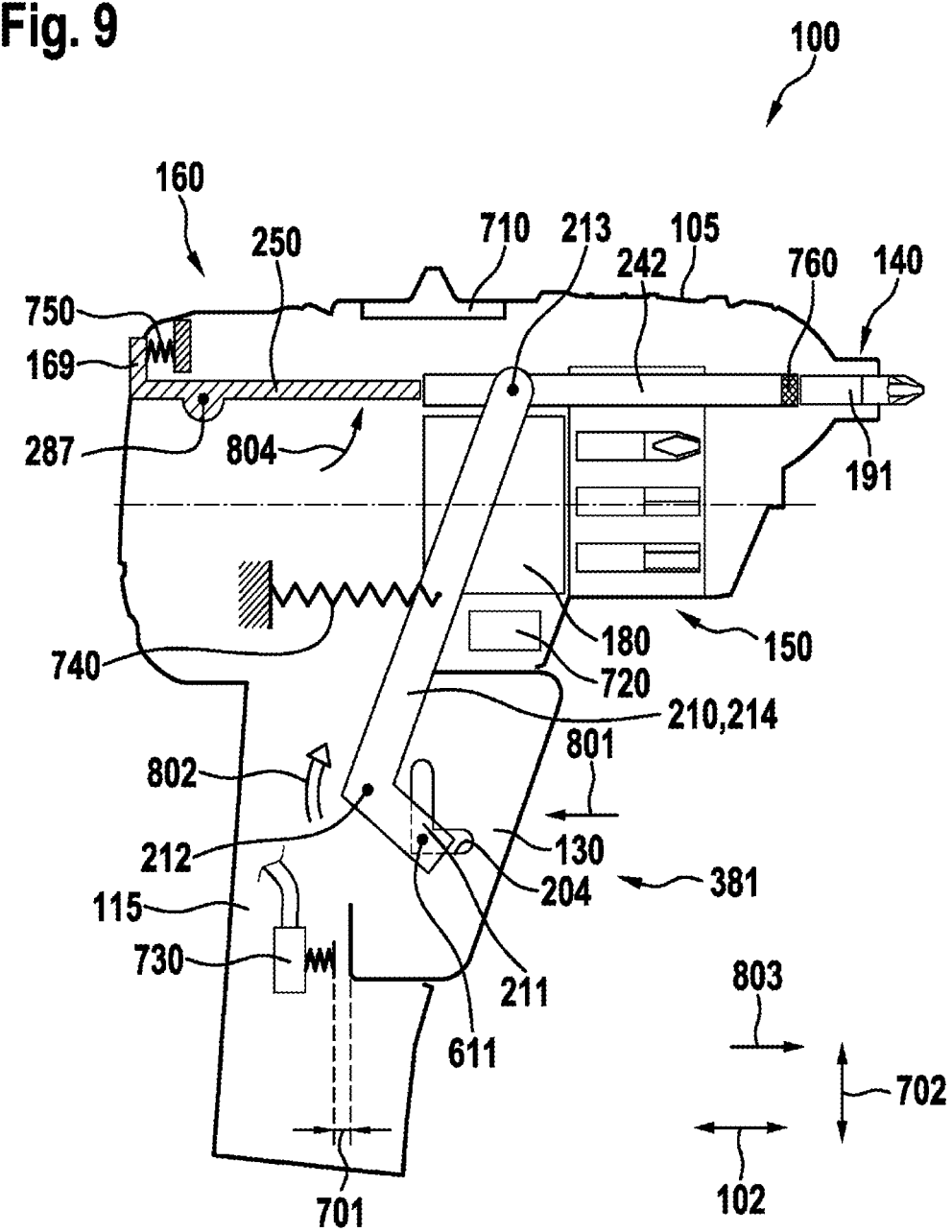
FIG. 9 is a side view of the hand-held power tool of FIG. 8 with an intermediate position of the loading device.

FIG. 9 shows hand-held power tool 100 of FIG. 8, wherein the manual switch 130 is arranged in the loading position 381. In the loading position 381, the manual switch 130 has been moved or actuated to the handle 115 in the direction of an arrow 801, as a result of which the distance 701 between the manual switch 130 and the on/off switch 730 is reduced. By actuating the manual switch 130, the receiving portion 211 of the lever arm 210 has been loaded to a portion, an illustratively lower portion in the vertical direction 702, of the receptacle 204 of the manual switch 130, as a result of which the lever arm 210 is tilted about its bearing element 212 in the clockwise direction 802. In this case, the loading element 242 is preferably displaced to the tool receiving area 140 in the longitudinal direction 102, or in the direction of an arrow 803. As a result of the loading element 242 being loaded by the lever arm 210, the locking element 250 is preferably pivoted from its release position 259 (cf. FIG. 2) into the locking position 359 (cf. FIG. 3) via its pivot bearing 287 in the direction of an arrow 804, or counter-clockwise. By moving the loading element 242, the insert tool 191 is loaded or moved from the insert tool magazine 150 into the tool receiving area 140.

FIG. 10 shows the hand-held power tool 100 of FIG. 8 and FIG. 9, wherein the manual switch 130 is arranged in a working position 899. In this case, the manual switch 130 loads the on/off switch 730, as a result of which the drive motor 180 is activated. In the working position 899, the receiving portion 211 of the lever arm 210 is arranged in an end of the receptacle 204 of the manual switch 130 arranged in the tool receiving area 140. By activating the drive motor 180, the insert tool 191 can thus rotate with the tool receiving area 140 in the circumferential direction 902.

By loading the unlocking element 169 of the locking element 250 in the direction of the tool receiving area 140, the spring element 750 is compressed and the locking element 250 can rotate about its pivot point 287 and release the loading element 242.

If a user of the hand-held power tool 100 releases the manual switch 130 in the working position 899, or removes the loading force from the manual switch 130, the manual switch 130 is moved or displaced into the loading position 381 of FIG. 9. Only by releasing the locking element 250 is the insert tool 191 moved from the tool receiving area 140 back into the insert tool magazine 150 and the manual switch is moved back into its rest position 281 (see FIG. 8).

Figure 11:
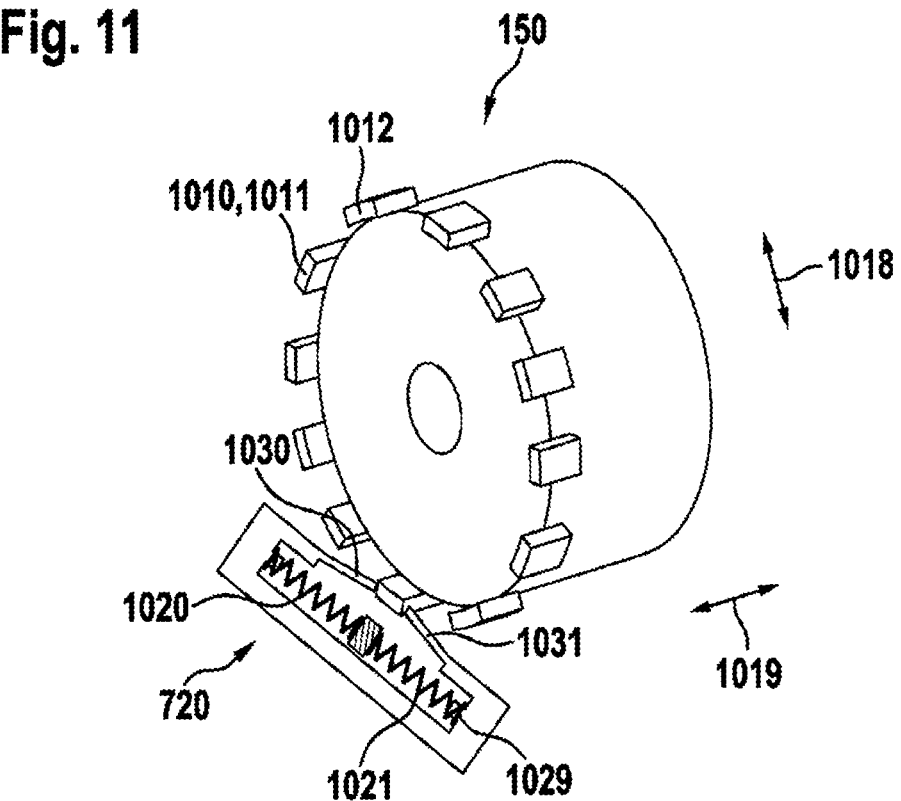
FIG. 11 is a perspective view of the insert tool magazine of FIG. 8 to FIG. 10 with an actuating element.

FIG. 11 shows the insert tool magazine 150 of FIG. 1 to FIG. 4, which, in accordance with one embodiment, has a plurality of latching elements 1010 on its outer circumference. Latching elements 1011, 1012 of the plurality of latching elements 1010 are preferably designed as an expansion in the radial direction 1018 and in the longitudinal direction 1019 of the insert tool magazine 150. The actuating element 720 of FIG. 7 is preferably associated with the insert tool magazine 150. The actuating element 720 preferably has a rectangular base body 1029, which is arranged parallel to the insert tool magazine 150. On its side facing the insert tool magazine 150, the actuating element 720 preferably has two loading webs 1030, 1031 facing one another. The loading webs 1030, 1031 are preferably arranged in such a way that a latching element 1011, 1012 of the plurality of latching elements 1010 can be arranged centrally with respect to the loading webs 1030, 1031. Furthermore, at least one, preferably at least two spring elements 1020, 1021 are associated with the actuating element 720. When the actuating element 720 is displaced in the transverse direction 1102, 1103 (see FIG. 12) of the magazine shaft 305 of FIG. 3, the spring elements 1020, 1021 can be compressed to rotate the insert tool magazine 150. By compressing one of the two spring elements 1020, 1021, a latching element 1011, 1012 of the plurality of latching elements 1010 is loaded by at least one loading web 1030, 1031.

FIG. 12 shows the insert tool magazine 150 of FIG. 11 and the actuating element 720 in the installed state in the housing 105 of the hand-held power tool 100. The actuating element 720 is arranged in the housing 105 in the manner of a rotational direction switch and can be actuated, or displaced, laterally, or in the transverse direction 499, or in the transverse direction 1102, 1103 of the magazine shaft 305. By loading the actuating element 720, by way of example in the transverse direction 1102, or illustratively to the right, the spring element 1020 is loaded and thus compressed against a support element 1099 fixed to the housing. In this case, the actuating element 720 is illustratively displaced to the right, wherein the loading web 1030 loads a latching element 1199 of the insert tool magazine 150, which is arranged between the loading webs 1030, 1031, counter-clockwise and thus rotates the insert tool magazine 150 in the circumferential direction 1101. In addition, FIG. 12 illustrates receptacles 1110 associated with the insert tool magazine 150 for the arrangement of insert tools 191, 192, 193, 194, 195 of the plurality of insert tools 196 of FIG. 1.

Figure 13:
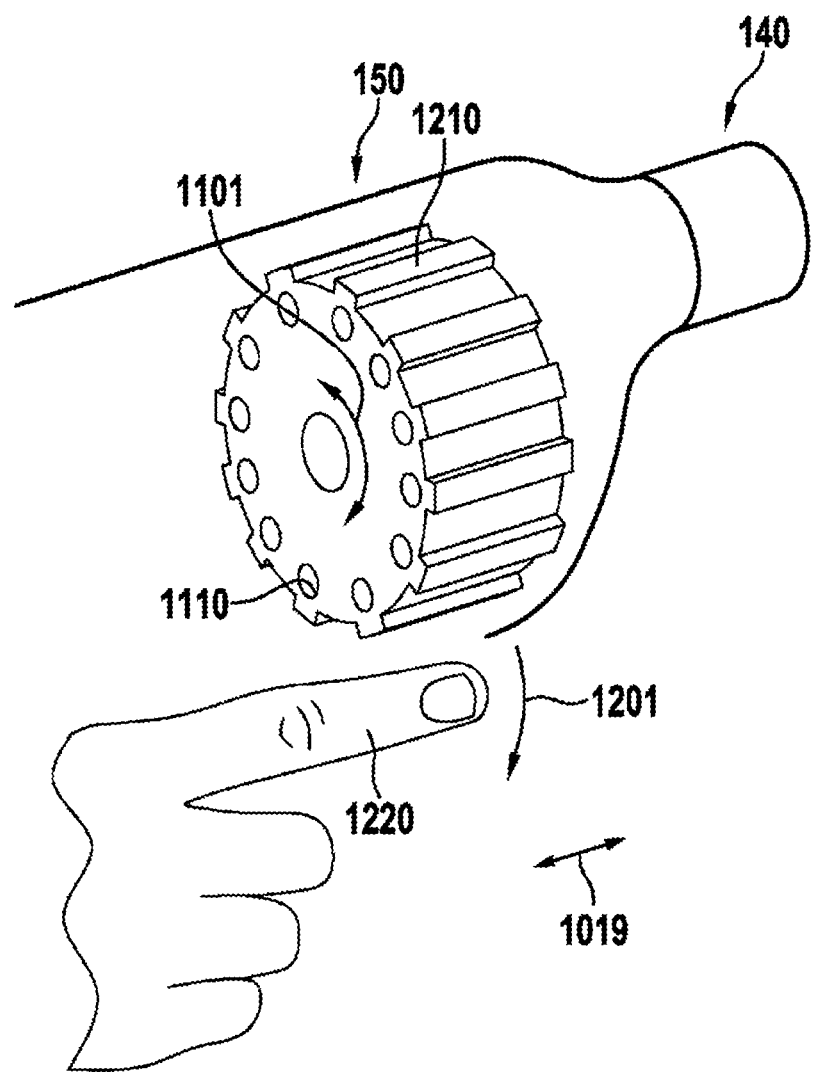
FIG. 13 is a perspective view of the hand-held power tool of FIG. 8 to FIG. 10 with an alternative insert tool magazine.

FIG. 13 shows the hand-held power tool 100 of FIG. 1 to FIG. 4 with the insert tool magazine 150, which, in accordance with a further embodiment, has loading webs 1210 only in the circumferential direction 1101. The loading webs 1210 are preferably formed along the entire longitudinal extension or longitudinal direction 1019 of the insert tool magazine 150. The loading webs 1210 are loaded by a user, in particular by a finger 1220 of a user of the hand-held power tool 100, which can cause rotation of the insert tool magazine 150 in the circumferential direction 1101. In this case, the insert tool magazine 150 is operated in the direction of an arrow 1201, or clockwise, by rotating or loading by means of a finger 1220, in particular an index finger of a user. In this case, the insert tool magazine 150 is rotated in the circumferential direction 1101, in particular clockwise, in order to select an insert tool.

The invention claimed is:

1. A hand-held power tool, comprising:
   at least one drive motor configured to drive a tool receiving area;
   a manual switch;
   a housing in which the at least one drive motor is arranged, wherein the at least one drive motor is further configured to be activated via the manual switch, and wherein the tool receiving area is designed to receive a selected insert tool of a plurality of selectable insert tools; and
   an insert tool magazine configured to store the plurality of selectable insert tools,
   wherein the manual switch is configured to be actuated in order to (i) load the selected insert tool arranged in the insert tool magazine in an axial direction of the at least one drive motor from the insert tool magazine into the tool receiving area, and (ii) activate the at least one drive motor.

2. The hand-held power tool in accordance with claim 1, wherein the manual switch is configured to be actuated from an unloaded rest position into (i) a loading position in which the selected insert tool arranged in the insert tool magazine is loaded into the tool receiving area, and (ii) a working position in which the at least one drive motor is activated.

3. The hand-held power tool in accordance with claim 2, wherein the manual switch is associated with a loading device with a loading element configured to load the selected insert tool arranged in the insert tool magazine into the tool receiving area in the loading position of the manual switch.

4. The hand-held power tool in accordance with claim 3, wherein the loading device has a lever arm which connects the manual switch to the loading element.

5. The hand-held power tool in accordance with claim 4, wherein:
   the lever arm is connected to the loading element via a slider,
   the slider has receptacles, and
   the lever arm has cams which are arranged in the receptacles.

6. The hand-held power tool in accordance with claim 5, further comprising at least one toothed wheel is arranged on the slider,
   wherein the loading element has an associated toothed rack portion configured to move the loading element in the axial direction of the at least one drive motor in order to load the selected insert tool arranged in the insert tool magazine into the tool receiving area.

7. The hand-held power tool in accordance with claim 3, wherein the loading device has a locking element configured to lock the loading element in a locking position in the loading position of the manual switch.

8. The hand-held power tool in accordance with claim 7, wherein the locking element is configured to be manually actuated in the locking position in order to release the loading element.

9. The hand-held power tool in accordance with claim 8, wherein:
   the manual switch arranged in the working position is configured to be released from the working position into the loading position in order to deactivate the at least one drive motor, and an adjustment of the manual switch from the loading position into the rest position takes place only if the locking element is arranged in an associated release position.

10. The hand-held power tool in accordance with claim 1, wherein:
   the insert tool magazine is mounted via a magazine shaft in or on the housing in a rotationally movable manner in order to facilitate selection of the selected insert tool from the plurality of selectable insert tools, and
   a rotation of the insert tool magazine for the selection of the selected insert tool from the plurality of selectable insert tools takes place by a user of the hand-held power tool manually rotating the insert tool magazine about the magazine shaft of the insert tool magazine.

11. The hand-held power tool in accordance with claim 10, further comprising an actuating element configured to actuate the insert tool magazine,
   wherein a displacement of the actuating element by a user of the hand-held power tool in the transverse direction of the magazine shaft of the insert tool magazine causes the insert tool magazine to rotate about the magazine shaft.

12. The hand-held power tool in accordance with claim 11, further comprising at least two spring elements and a support element, wherein:
   the actuating element is associated with the at least two spring elements,
   the at least two spring elements are configured to be compressed when the actuating element is displaced in the transverse direction of the magazine shaft in order to rotate the insert tool magazine, and
   the support element is fixed to the housing and arranged between the at least two spring elements.

13. The hand-held power tool in accordance with claim 7, wherein:
   the manual switch is arranged on a handle of the hand-held power tool,
   the locking element is arranged on a region of the housing of the hand-held power tool facing away from the tool receiving area, and
   the insert tool magazine is arranged on a region of the housing of the hand-held power tool facing the tool receiving area and the manual switch in such a way that one-handed operation is made possible.

14. The hand-held power tool in accordance with claim 1, wherein the hand-held power tool is a power screwdriver.

15. The hand-held power tool in accordance with claim 13, wherein the actuating element is arranged on the region of the housing of the hand-held power tool facing the tool receiving area and the manual switch in such a way that one-handed operation is made possible.

* * * * *